Sept. 18, 1962  R. B. NAWMAN  3,054,515
AUTOMATIC PALLET LOADER
Filed March 25, 1960  5 Sheets-Sheet 1

INVENTOR
ROLLIE B. NAWMAN
BY
Gardner & Zimmerman
ATTORNEYS

INVENTOR
ROLLIE B. NAWMAN
BY
ATTORNEYS

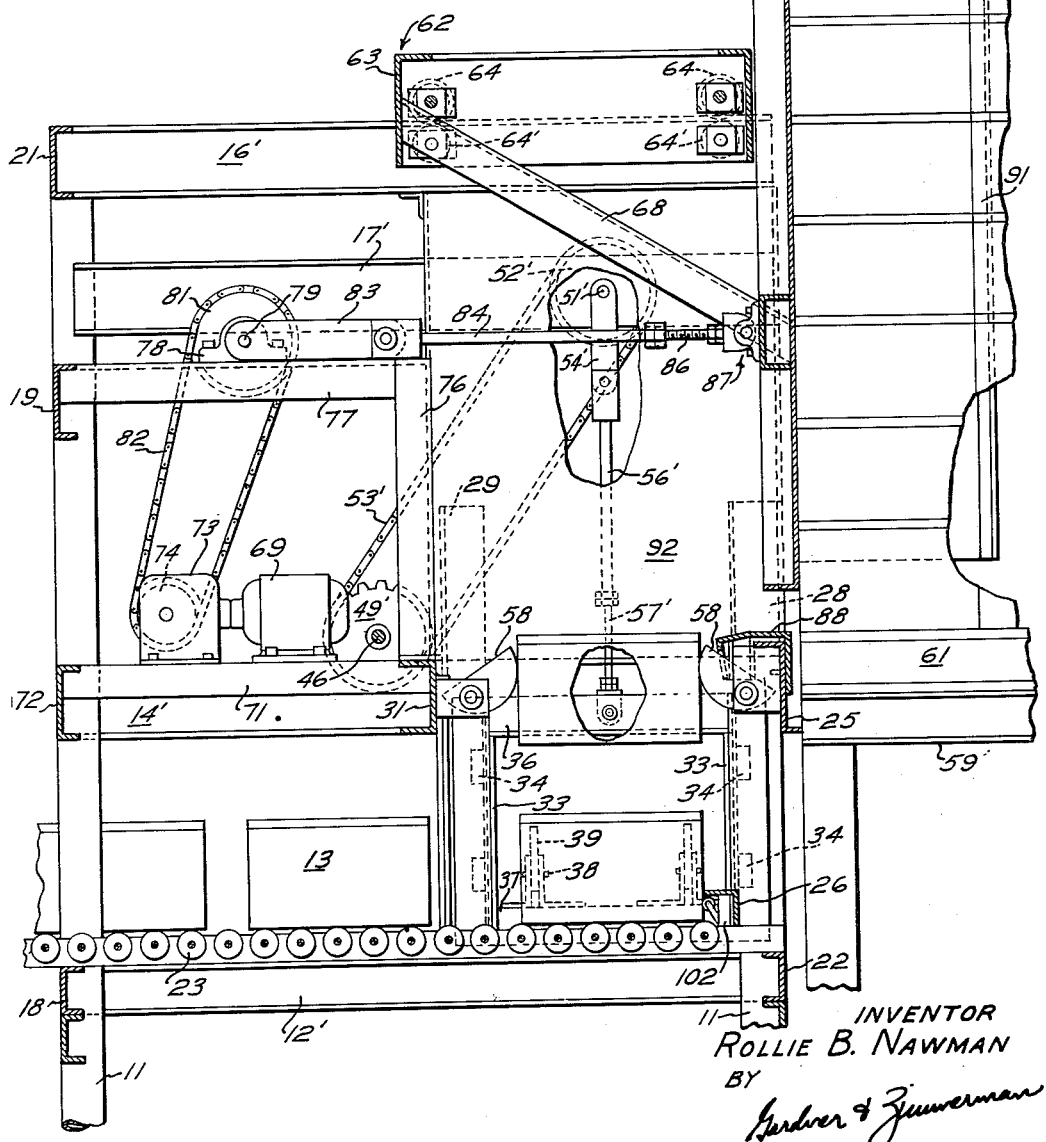

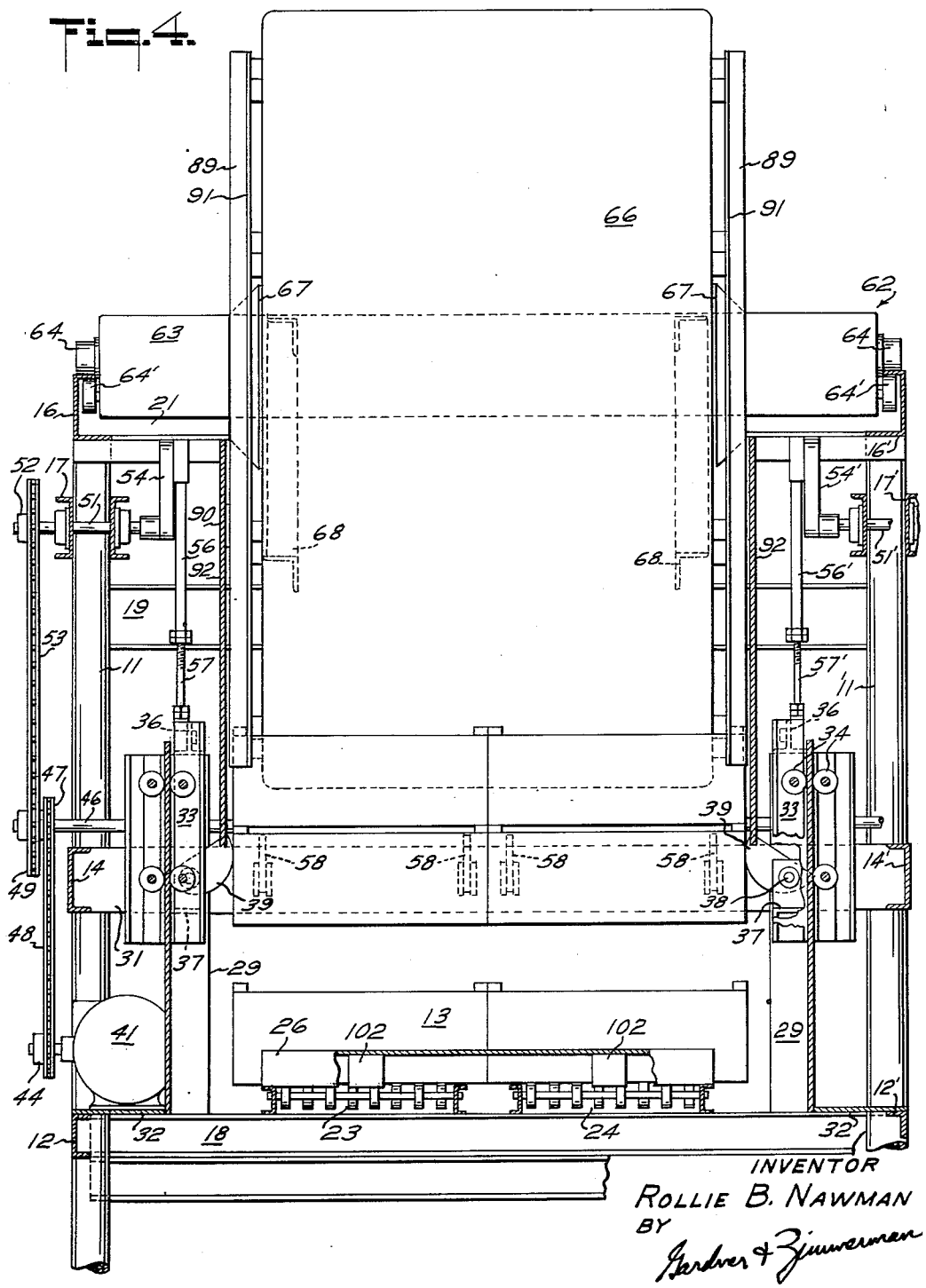

Sept. 18, 1962 R. B. NAWMAN 3,054,515
AUTOMATIC PALLET LOADER
Filed March 25, 1960 5 Sheets-Sheet 5

INVENTOR
ROLLIE B. NAWMAN
BY
ATTORNEYS

United States Patent Office 3,054,515
Patented Sept. 18, 1962

3,054,515
AUTOMATIC PALLET LOADER
Rollie B. Nawman, Oakland, Calif., assignor to Benner-Nawman, Inc., Oakland, Calif., a corporation of California
Filed Mar. 25, 1960, Ser. No. 17,612
7 Claims. (Cl. 214—6)

The present invention relates to the handling of boxes and other containers and more particularly to an automatic apparatus for stacking boxes, cartons and the like on pallets.

In many processing and manufacturing operations goods are received and distributed in rectangular boxes or cartons and the transport, stacking and storing of these containers frequently requires much labor, equipment and floor space. A food cannery, for example, is a type of plant in which the handling of boxes is of considerable importance.

In a cannery, as in many other plants, the boxes are generally stacked on flat platforms, or pallets, since the pallet may be lifted by means of a fork-lift truck and may be readily transported thereby. While the use of pallets in conjunction wtih lift-trucks effects a considerable saving in labor, a sizeable manual effort may still be required to stack the boxes on the pallets.

In operations where the boxes arrive on a conveyor line at an irregular rate, or at a slow rate, a considerable inefficiency may be present in that the number of workers assigned to the stacking step cannot be matched to the work load. In this circumstance it is necessary to provide either an undue number of workers or else, as is more common, to set aside a sizable amount of floor space for an accumulation area.

Thus an increase in efficiency and economy may be made by automating the box stacking operation. Accordingly this invention provides a fully automatic machine for receiving boxes from a conveyor line and for stacking columns of such boxes on pallets in positions where the loaded pallets may readily be moved by a lift truck.

Salient features of the mechanism are a horizontal conveyor for receiving incoming boxes and an elevator structure which grips each incoming box at the terminus of the conveyor and lifts it to the bottom of a vertical column of boxes. When the column has reached a preselected height, a horizontally traveling ram pushes the boxes sidewise onto a pallet which rests on a table adjacent the elevator. The apparatus may be designed to receive boxes in a single file thereof or in a double column and may be adapted to stack varying numbers of boxes on the pallet. The stacking of the boxes is accomplished much more rapidly than is done by manual labor and the mechanism possesses further advantages in that it may be readily assembled and disassembled and may be easily coupled to existing box conveyer systems.

Accordingly it is an object of this invention to expedite the handling of boxes, cartons and the like containers.

It is an object of this invention to provide an automatic mechanism for stacking boxes on pallets.

It is a further object of the invention to provide an automatic apparatus capable of receiving boxes from a conveyer at widely varying rates and which continuously acts to stack said boxes on pallets whereby no accumulation area is needed at the end of the conveyer.

It is an object of the invention to provide a mechanism for stacking boxes received from a conveyer which mechanism may be adapted to receive either a single or a double column of boxes.

Still another object of the invention is to provide a mechanism for stacking containers on pallets which mechanism may be readily assembled and disassembled and which may be conveniently coupled to existing conveyor systems.

It is an object of the invention to provide an automatic mechanism for stacking boxes on a pallet whereby the boxes may be conveniently transported by a lift truck, the mechanism being capable of handling boxes of different dimensions and being capable of stacking any selected number of boxes on the pallet.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 3 is an elevational section view of the stacking mechanism taken along line 3—3 of FIGURE 2 and with a movable ram portion shown traveled to a more forward position.

FIGURE 4 is a transverse section view taken along line 4—4 of FIGURE 2 and again showing the ram moved to the rearward position and showing a box elevating mechanism moved to a raised position.

FIGURE 5 is a diagram of control circuitry for the apparatus of FIGURES 1 through 4.

Figure 1:
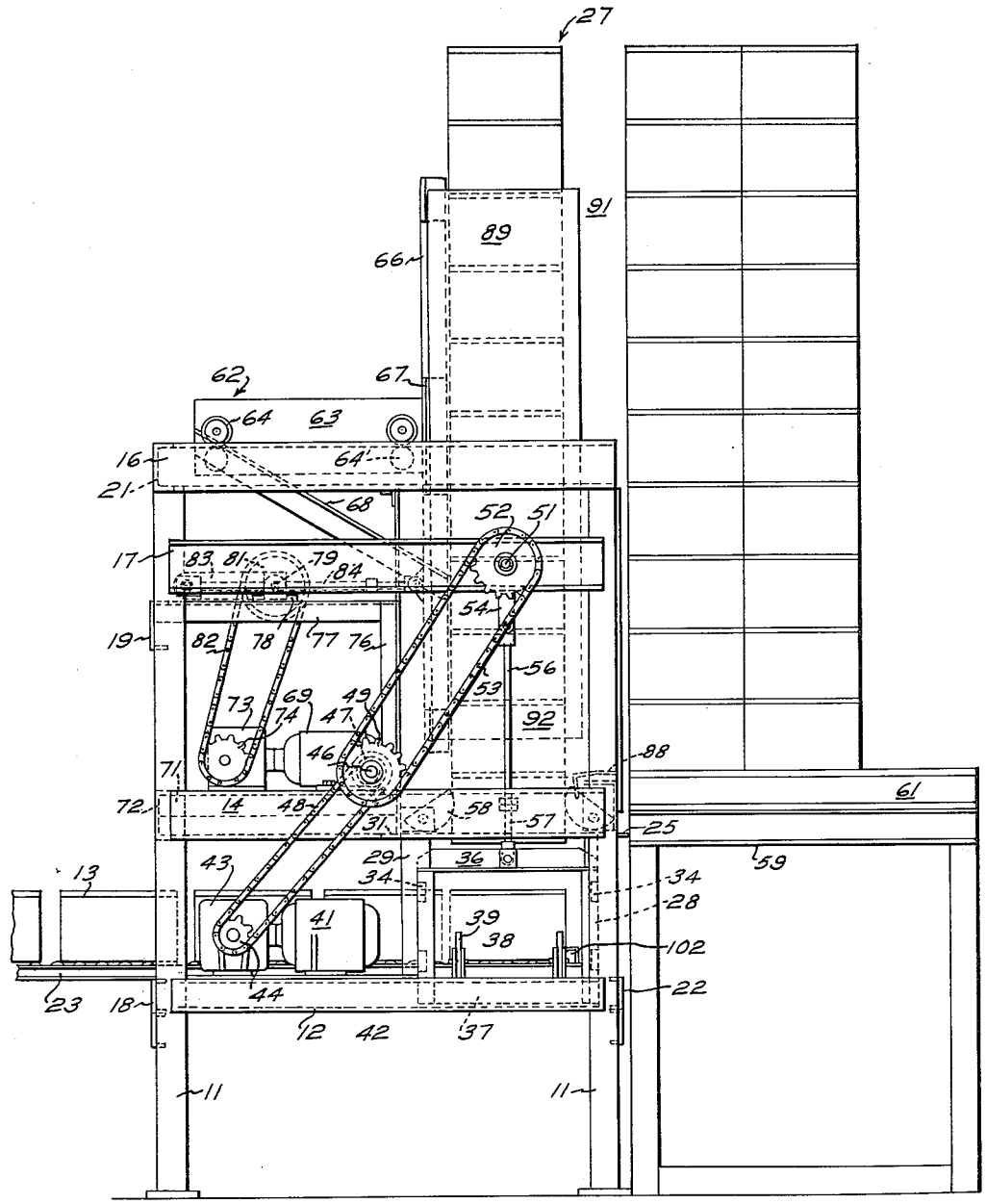
FIGURE 1 is a side elevation view of a preferred embodiment of the invention.
Figure 2:
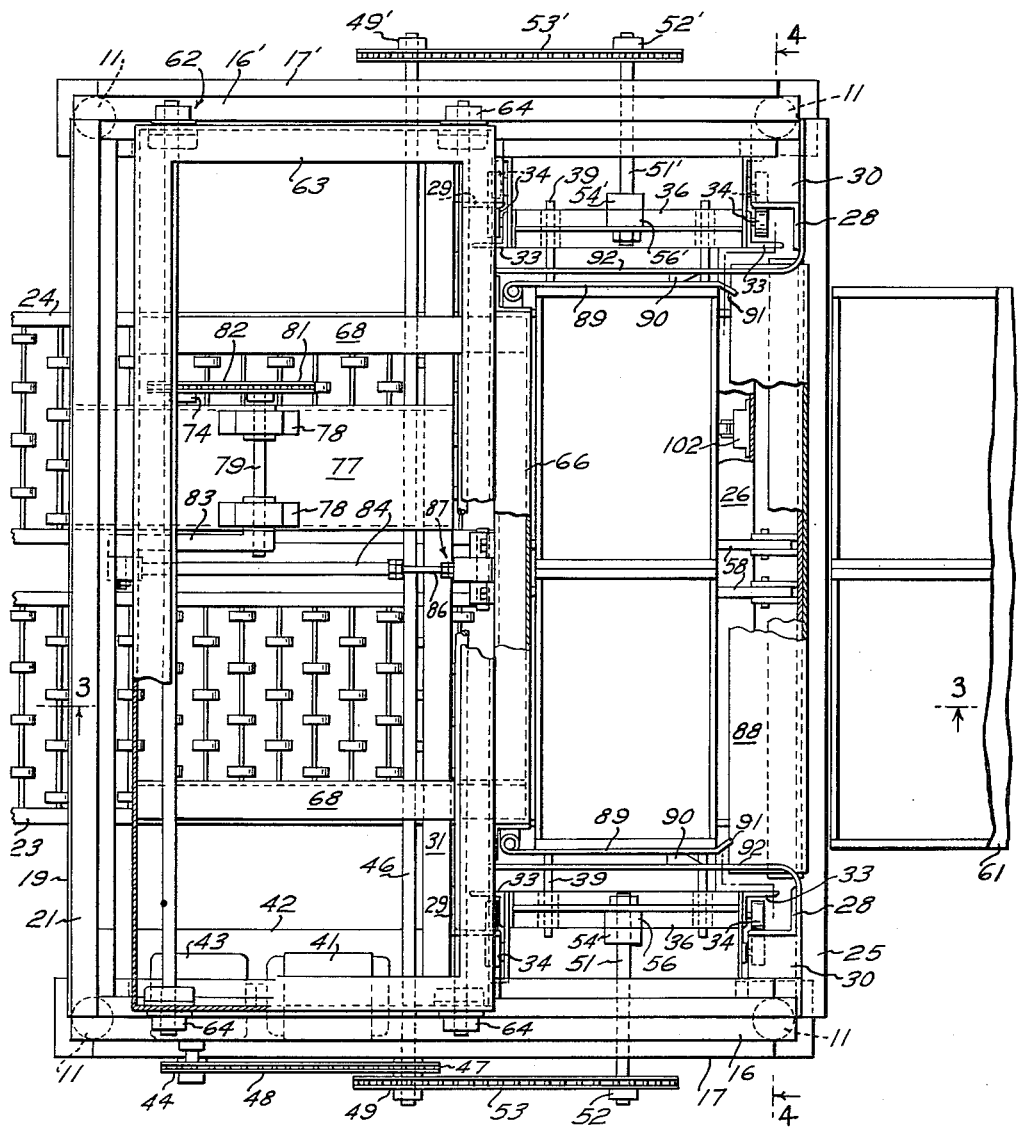
FIGURE 2 is a plan view of the apparatus of FIGURE 1.

Referring now to the drawing and more particularly to FIGURES 1, 2 and 3 thereof, there is shown a generally rectangular frame structure supported on four tubular upright corner posts 11. Four horizontal channel members extend between the two corner posts 11 along each side of the frame structure, the lowermost channel members 12 and 12' being at a level immediately beneath that at which boxes 13 are to arrixe on a conveyor and the next more elevated channel members 14 an 14' being at a level somewhat above the top of the boxes. The uppermost channel members 16 and 16' extend between the tops of corner posts 11 and the fourth pair of channels 17 and 17' are spaced a small distance therebelow. Each of the above described channel members are disposed with the turned edges directed towards the center of the structure with the exception of members 17 and 17' the edges of which project outwardly.

At the rearward face of the frame, three horizontal channel members extend between the cornerposts 11, a first channel 18 being at the level of channel 12, and intermediate channel 19 being slightly below the level of channel 17, and an upper channel 21 being disposed between the tops of the posts. At the front of the frame a lower channel 22 extends between the cornerposts at the level of channels 12 and a more elevated channel 25 extends between the posts at the level of channel 14.

Considering now the conveyer means on which boxes 13 are received by the stacker, a pair of parallel flat roller beds 23 and 24 extend between channel members 18 and 22, the beds 23 and 24 being spaced apart slightly and positioned one on either side of the center of the frame. The beds 23 and 24 may extend rearwardly from the stacker, as shown in FIGURE 1, to connect with existing box delivery conveyer systems. The beds 23 and 24 terminate at channel 22 and to stop the forward motion of boxes and angle bar 26 is disposed across the forward ends of the two beds.

In this embodiment of the apparatus two columns of incoming boxes are handled, one column on each of the beds 23 and 24. The box at the forward end of each bed is lifted upward to the bottom of a double vertical stack 27 of boxes by an elevator mechanism, which elevator carries the forward box from each column simultaneously. Considering now the structure of the elevator, a pair of angle iron rails 28 and 29 are disposed in an upright position at the outer side of each bed 23 and 24, rails 28 being secured to the forward corner posts 11 by means of brackets 30 and rails 29 being spaced rearwardly therefrom a distance slightly in excess of the width of the boxes 13. The rearward rails 29 are secured by attachment to a cross channel 31 which extends between the central sections of channels 14 and 14' and by brackets 32 which connect the lower end of each rail 29 with the lowermost channel members 12 and 12' respectively.

With reference to FIGURES 3 and 4 in particular, the movable carriage of the elevator mechanism is formed by four short sections of channel 33 one of which rides on each rail 28 and 29 by means of spaced apart pairs of roller wheels 34 which are mounted on the inside of the channel section and which bear on opposite faces of the associated rail. The channels 33 on each associated pair of rails 28 and 29 are joined together to form a unitary rectangular framework by upper and lower cross-pieces 36 and 37 respectively.

To enable the elevator carriage to grip boxes 13, a pair of semi-circular dogs 39 are provided on each of the lower cross pieces 37. As shown in FIGURE 1 the dogs of each pair are spaced apart a distance slightly less than the width of the boxes and are eccentrically mounted on stub shafts 38 journalled in brackets carried by the cross piece 37.

As illustrated in FIGURE 4 in particular, the dogs 39 are disposed with the convex faces lowermost so that as the elevator carriage moves downwardly the dogs ride along the ends of the pair of boxes 13. When the carriage moves upwardly, however, the dogs 39 exert a wedging action against the boxes and lift the same. To facilitate gripping of the boxes 13, it may be convenient to make the convex surfaces of the dogs 39 of a rough or knurled configuration.

Means for effecting an up and down motion of the elevator carriage comprises an electrical drive motor 41 mounted on a baseplate 42 which baseplate is secured to channels 12 and 18 and the side of bed 23. Motor 41 drives a speed reduction gearbox 43 which gearbox is provided with a power take-off pulley 44 at the outer side. An axle 46 extends across the frame immediately above the central sections of channels 14 and 14', the axle mounting a pulley 47 which is co-planar with power take-off pulley 44 and coupled thereto by a chain belt 48. A pair of pulleys 49 and 49' are mounted on the extremities of axle 46 which pulleys are rotated by motor 41 through the described linkage.

A first short rotary axle 51 is transpierced through channel 17 and a second like axle 51' is transpierced through channel 17', the two rotary axles being aligned along a common axis which intersects the centerline of the vertical box stack 27. A pair of sprocket pulleys 52 and 52' are mounted one on the outer end of each of the rotary axles 51 and 51'. A pair of chain belts 53 and 53' couple pulley 49 to pulley 52 and pulley 49' to pulley 52' respectively.

A pair of crank arms 54 and 54' project radially from the inner extremities of the rotary axles 51 and 51' respectively. The upper ends of a pair of drive rods 56 and 56' are pivotably attached to the ends of crank arms 54 and 54' respectively, the rods extending downwardly towards the elevator carriage. A shaft 57 and 57' is pivotably attached to the center of each carriage upper cross-piece 36, the upper ends of the shafts being threaded and engaged in a threaded axial bore in the lower ends of the rods 56 and 56'.

Thus upon operation of motor 41 the above described mechanism will act to reciprocate the elevator carriages in a vertical direction. As has hereinbefore been described, downward motion of the carriage will cause the dogs 39 to ride down against the ends of a pair of boxes and upward motion will cause the dogs to grippingly engage the ends of the pair of boxes to lift them from the conveyer. Considering now the means by which the pair of boxes are released from the dogs 39 and held in the elevated position, there is shown a further set of eight semicircular dogs 58, four of which are pivotably mounted on the inner face of frame member 25 and the remaining four of which are pivotably mounted on cross channel 31. The dogs 58 are disposed at right angles to the associated frame members and are eccentrically attached thereto with the convex faces of the dogs being lowermost. Thus a pair of boxes 13 may be lifted between the dogs 58 by the described elevator mechanism but cannot return downward owing to the wedging action of the dogs. A pair of boxes 13 which are gripped in this manner by the dogs 58 will be lifted higher when a subsequent pair of boxes is elevated and thus the double vertical stack of boxes 27 will be built up by successive reciprocations of the elevator, the stack being always supported by the dogs 58.

A table 59 is disposed immediately forward from the frame on which table a conventional pallet 61 may be disposed, the height of the table being such that the top of the pallet is level with the top of the lowermost box 13 in the vertical stack 27. A ram mechanism is provided to shove the stack 27 forwardly onto pallet 61 when the stack has reached a selected height.

Components of the ram mechanism comprise a trolley 62 formed by a rectangular frame 63 which is disposed between the uppermost side frame channels 16 and 16'. A pair of vertically spaced roller wheels 64 and 64' are mounted at each end of the side members of frame 63 which wheels bear on the inturned edges of channels 16 and 16' and adapt the frame to roll forwardly and rearwardly thereon.

To push against the box stacks 27, a rectangular upright plate 66 is secured to the forward edge of trolley frame 63 by a pair of brackets 67, the lowermost edge of the plate being slightly above the level of the upper surface of pallet 61. To reinforce the plate 66, a pair of diagonal braces 68 extend from the rear portion of frame 63 to the lateral edges of the plate at a level thereon below that of the frame.

Thus with the trolley moved to the rearward position as illustrated in FIGURE 1, the elevator mechanism may build up the vertical box stack 27 as hereinbefore described. When the stack 27 has reached a desired height, movement of the trolley in the forward direction causes the plate 66 to shove the stack onto pallet 61. It may be seen that as subsequent stack s27 are pushed onto the pallet, the original stack is pushed still more forwardly thereon until the pallet is completely loaded and may be removed by a lift truck and replaced with an empty pallet.

Considering now the drive means by which such movement of the trolley is accomplished, a second electrical drive motor 69 is secured to a horizontal beam 71 which extends between the central area of cross channel 31 and the center of a cross-member 72 which is disposed between the rear corner-posts 11. Motor 69 drives a speed reduction gearbox 73 which gearbox is provided with a power take-off pulley 74 at one side.

A short frame member 75 extends upwardly from the center of cross channel 31 and a second short frame member 77 extends between the upper end of member 76 and the central portion of channel member 19. Bearings 78 are mounted on the top surface of member 77 and a short axle 79 is journalled therein. Axle 79 is turned by a sprocket pulley 81 mounted thereon which pulley is coupled to pulley 74 by a continuous chain 82.

To reciprocate the ram plate 66, a radial crank arm is secured to the end of axle 79 opposite pulley 81 which crank arm is pivotably connected to the rearward end of a drive rod 84. A threaded rod 86 extends forwardly from the front end of drive rod 84 and is pivotally attached to the rearward face of the ram plate 66 by a bearing assembly 87. Accordingly, operation of drive motor 69 will act through the foregoing mechanisms to reciprocate the trolley in a forward and rearward direction and will thus cause plate 66 to push successive box stacks 27 onto pallet 61 as hereinbefore described.

To provide support for the stack 27 at such time as it has been partially pushed forward, a horizontal plate 88 is secured along the top of frame member 25, the rearward edge of the plate being inclined slightly downward and subsequently turned under at approximately a ninety degree angle. To provide lateral support for the stack 27, a pair of extensive side-plates 89 are disposed in an upright position one on each side of the stack. As best shown in FIGURES 2 and 4 such side-plates 89 are pivotally mounted by means of spring loaded hinges on opposed vertical sides of the ram plate 66 and extend forwardly adjacent the ends of the box stack 27. Forward edge portions 91 of the side plates 89 are inclined inwardly relative to one another to overlie the leading side of the box stack in order to prevent the boxes from tipping forward. It will thus be seen that during stacking of the boxes as well as during forward movement of the stack by the ram plate 66 all four vertical surfaces of the stack are provided with adequate supporting means against displacement in any direction. As the ram plate 66 is retracted, as previously described, the side-plates are pivoted outwardly against the bias of the spring load due to the inwardly inclined edge portions 91 now engaging the ends of the stack. Upon final disengagement of the side-plates from the stack the plates return to their normal position of substantially parallel relationship. To additionally insure the return of the side-plates to their proper normal position, a pair of vertically extending guide members 92 are disposed outwardly of the side plates in parallel relationship thereto, each of such guide members being provided with a dog 90 which intercepts the exterior surface of the adjacent side-plate as the ram plate 66 is retracted to return and maintain the side plates in the normal position.

Ordinarily the two drive motors 41 and 69 will each operate only intermittently and at separate times. Elevator drive motor 41 will be operated to revolve pulleys 52 one complete turn when each successive pair of boxes 13 have arrived at the forward end of conveyers 23 and 24. Ram drive motor 69 will be operated to revolve pulley 81 one complete turn each time stack 27 has reached the desired height. In each instance of operating a drive motor, the remaining drive motor will preferably be inactivated. While control of the motors 41 and 69 to accomplish the foregoing may be done manually by suitable switches, it will generally be found preferable to make use of an automatic control circuit.

Referring now to FIGURE 5, a suitable motor control circuit is shown schematically. The primary winding of a power transformer 93 is connected to a convenient source of alternating single phase current by means of suitable terminals 94. A pair of bus conductors 96 and 97 are connected to opposite sides of the secondary of transformer 93.

Considering first the elevator drive circuit, the drive motor 41 is connected across conductors 96 and 97 in series with a first normally closed switch 98, a second normally closed switch 99, a normally open switch 101 and a relay driver coil 100. Switches 99 and 101 are shunted by a pair of series connected microswitches 102 which microswitches, as shown in FIGURES 1 and 3 are physically located at the head of the box conveyer beds 23 and 24 in position to be closed by the arrival of a box 13 at the forward end of each conveyer.

With reference again to FIGURE 5, the closing of microswitches 102 will energize the drive motor 41 and initiate operation of the elevator mechanism as hereinbefore described. The closing of the microswitches also serves to energize the relay driver 100 which is coupled to close switch 101 thereby continuing operation of the drive motor 41 after the microswitches 102 have opened due to the removal of the boxes from the conveyer. The motor 41 is provided with a suitable cam mechanism whereby switch 98 is momentarily opened after the elevator has completed a reciprocation and thus the circuit returns to the original condition to await the arrival of a subsequent pair of boxes.

To count the number of boxes which have been lifted by the elevator mechanism, in order to initiate operation of the ram when the stack of boxes has reached a desired height, a counting circuit 103 is connected between conductors 96 and 97 in series with a manual normally closed switch 104 and a normally open switch 106. Switch 106 is operated by relay driver 100 in the elevator circuit so that the counter registers a count each time the elevator drive motor 41 operates. The manual switch 104 is provided so that the counter may be disconnected and the ram controlled by an operator if automatic operation is not desired.

The counting circuit 103 is preferably of a type having an adjustable scaling factor and delivers an output signal to a relay driver coil 107 which, as will be described, serves to initiate operation of the ram mechanism.

The ram drive motor 69 is connected between conductors 96 and 97 in series with a normally open manual switch 108 and a relay driver 109, the manual switch being for operator control of the ram at such time as switch 104 in the counting circuit is open. A normally open switch 111 is connected in parallel with switch 108 and is operated by relay driver 107 in the counter circuit so that an output signal from the counter acts to initiate operation of the ram drive motor 69.

A series connected normally open switch 112 and normally closed switch 113 are also connected in parallel with switch 108. Switch 112 is operated by relay driver 109 in order to continue operation of the ram drive motor 69 after the starting switch 111 has been opened. Switch 113 is opened by a suitable cam mechanism on the drive motor 69 after the ram has completed a reciprocation.

While the counting circuit 103 will normally operate on the basis of a pre-selected scale factor, i.e. the boxes will be stacked to a pre-determined height, it may occasionally be desired to operate the ram manually with some lesser number of boxes in the stack. To correct the accumulated count for the subsequent counting cycle, a re-set signal is automatically applied to the counter by a connection 114 between the counter 103 and a terminal of switch 108.

Figure 6:
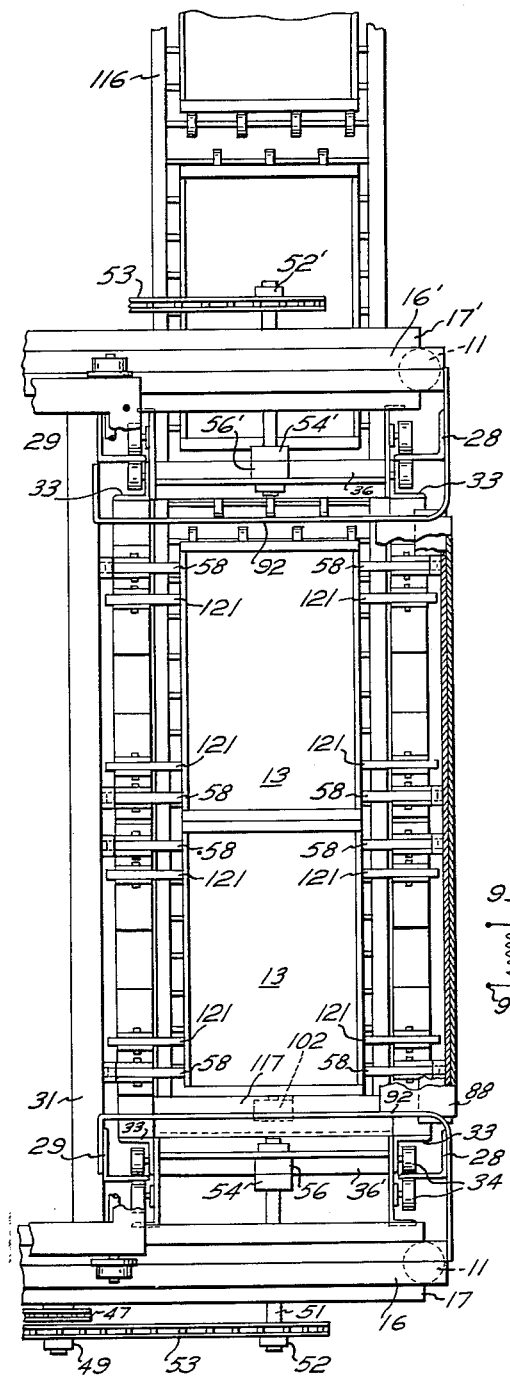
FIGURE 6 is a partial plan view showing a modified form of the mechanism with which a single column of boxes may be received from a lateral direction, portions of the mechanism being broken away to more clearly illustrate the modifications.
Figure 7:
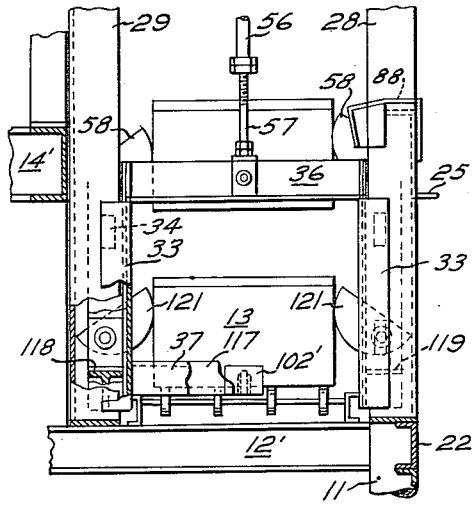
FIGURE 7 is a partial section view taken along line 7—7 of FIGURE 6 and further illustrating the modified stacking mechanism.
Figure 8:
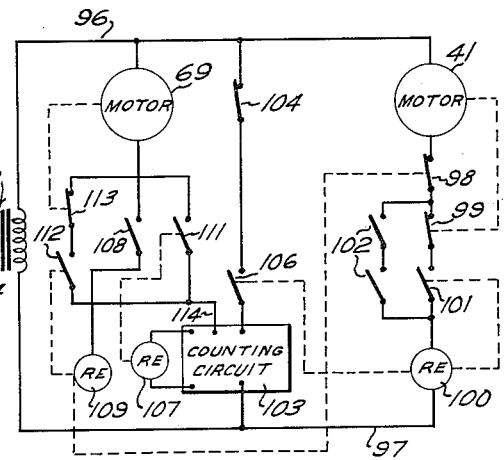

Referring now to FIGURES 6 and 7, a modification of the invention is shown with which a single column of boxes may be received from one side, the apparatus being similar to that hereinbefore described except as will now be pointed out.

In this embodiment the two forwardly directed box conveyer beds are removed and replaced with a single horizontal conveyer 116 which enters the frame at right angles and extends between the lower lateral frame channels 12 directly beneath the elevator carriages. Boxes 13 are fed in along the conveyer 116 in a single column and are stopped by abutment against a cross-member 117 at the head of the conveyer. By this means a pair of boxes are brought into the same position as in the previously described embodiment and the presence of the boxes is registered by a microswitch 102' disposed on the inner face of the cross-member 117.

Considering now a further modification in the structure, it will be seen that the elevator mechanism must grip the boxes 13 at the sides rather than at the ends as was previously done. Accordingly the dogs on the lower cross-pieces 37 are no longer employed as was done in the previous instance. A horizontal beam 118 extends between the lower ends of the rearmost pair of channels 33 and a similar beam 119 extends between the lower ends of the more forward pair of channels 33. Eight of the eccentrically mounted semi-circular dogs 121 are spaced along the upper surface of each beam 118 and 119, such dogs again having the convex surfaces lowermost and being pivotable in the direction of the boxes 13. The dogs 121 are grouped in pairs along each beam 118 and 119, one pair being close to each end of each of the boxes 13 and being spaced to avoid interfering with the stack gripping dogs 58.

It should be understood that other variations in the structure are possible within the spirit and scope of the invention. The mechanism may be adapted, for example, to lift a single column of boxes or a multiple column thereof rather than the double column herein described. Similarly, the feed-in of boxes may be accomplished from any of various directions.

What is claimed is:

1. In an apparatus for stacking boxes on a pallet, the combination comprising a frame structure, a horizontal conveyer disposed at a lower portion of said frame for receiving said boxes in a columnar file and having provision for arresting the motion of said boxes at a point within said frame structure, an elevator mechanism mounted on said frame for reciprocation in a vertical direction, said elevator mechanism being disposed over said conveyer and having provision for engaging said boxes thereon and lifting said boxes upwardly, a clamping means secured to said frame above said elevator mechanism for receiving successive ones of said boxes lifted thereby and for supporting said boxes in a vertical column, a horizontally traveling ram mounted on said frame, said ram being travelable above said clamping means for supporting said boxes whereby said pallet receives said vertical columns of boxes, said ram including a pair of side plates providing lateral support for said boxes during stacking and movement thereof, said side plates mounted for pivotal movement about vertical axes and spring loaded towards each other to normal positions in substantially parallel relationship, said side plates having inwardly inclined leading edge portions engageable with the leading sides of boxes in said column, said plates in their normal positions engaging said boxes during stacking and movement thereof to said pallets, said plates pivoted away from each other by engagement of said leading edge portions with said boxes during movement of said ram away from said pallets.

2. An apparatus for stacking boxes on a pallet substantially as described in claim 1 and wherein said provision for arresting the motion of said boxes comprises electrical switch means operable in response to abutment of leading ones of said boxes in said columnar file thereagainst, said apparatus comprising the further combination of an electrical drive motor coupled to said elevator mechanism in driving relationship thereto, said drive motor being connected for starting upon operation of said switch means and having provision for stopping after a predetermined number of reciprocations of said elevator mechanism.

3. An apparatus for stacking rectangular boxes on pallets comprising, in combination, a frame structure, at least one horizontal conveyer entering a lower portion of said frame for receiving said boxes in a columnar file, said conveyer having provision for arresting motion of said boxes within said frame, an elevator mechanism mounted within said frame over said conveyer for reciprocation in a vertical direction, said elevator having a pair of spaced apart members disposed one over each side of said conveyer and having at least one element attached to each of said members for engaging said boxes whereby the latter are lifted by said elevator, a first drive motor connected to reciprocate said elevator, a clamping means secured to said frame above said elevator for receiving successive ones of said boxes lifted by said elevator and for supporting said boxes in a vertical column, an upright ram plate mounted on said frame above said clamping means, said ram plate being reciprocable in a horizontal direction, a second drive motor connected to selectively reciprocate said ram plate to move said vertical column of boxes in a horizontal direction, a table disposed opposite said ram plate for supporting said pallet whereby successive ones of said vertical columns of boxes are pushed onto said pallet by said ram plate, said side plates mounted upon said ram plate for pivotal movement about vertical axes and spring loaded towards each other to normal positions in substantially parallel relationship engageable with the sides of boxes in said vertical columns, said side plates having inwardly inclined leading edges engageable with the leading sides of boxes in said vertical columns during stacking and pushing movement thereof, said plates pivoted away from each other by engagement of said leading edge portions with said boxes during return movement of said ram plate.

4. An apparatus for stacking boxes on pallets substantially as described in claim 3 and wherein said provision for arresting motion of said boxes on said conveyer comprises electrical switch means disposed thereon and operated by motion of said boxes thereagainst, said switch means being connected to sart said first drive motor upon arrival of leading ones of said boxes in said columnar file, and comprising the further combination of means for terminating operation of said first drive motor after a predetermined number of reciprocations of said elevator, a counter connected to totalize successive operations of said first drive motor and to start said second drive motor after a pre-determined number of operations of said first drive motor, means for terminating operation of said second drive motor after each single reciprocation of said ram plate.

5. An apparatus for stacking boxes on pallets substantially as described in claim 3 and wherein said horizontal conveyer enters said frame at right angles to the direction of travel of said ram plate whereby said elevator may lift a plurality of said boxes at one time.

6. An apparatus for stacking rectangular boxes on pallets comprising, in combination, a frame structure, two parallel horizontal conveyers entering a lower portion of said frame for receiving said boxes in double columnar file, said conveyers having provision for arresting motion of said boxes within said frame, an elevator mechanism mounted within said frame over said conveyers for reciprocation in a vertical direction, said elevator having a pair of spaced apart members disposed one over the outer side of each of said conveyers and having at least one element attached to each of said members for engaging leading pairs of said boxes whereby the latter are lifted by said elevator, a first drive motor connected to reciprocate said elevator, a clamping means secured to said frame above said elevator for receiving sucessive pairs of said boxes lifted by said elevator and for supporting said boxes in a pair of vertical columns, an upright ram plate mounted on said frame above said clamping means, said ram plate being reciprocable in a horizontal direction parallel to the direction of travel of said conveyors, a second drive motor connected to selectively reciprocate said ram plate to move said pair of vertical columns of boxes in a horizontal direction, a table disposed opposite said ram plate for supporting said pallet whereby successive ones of said pairs of vertical columns of boxes are pushed onto said pallet by said ram plate, a horizontal column support plate for supporting and guiding said columns during said pushing movement thereof, and said ram plate having pivotally mounted side plates thereon and providing lateral support for said pairs of columns.

7. In an apparatus for stacking boxes on a pallet, the combination comprising a frame structure, a pair of parallel horizontal conveyers entering a lower portion of said frame for receiving said boxes in double columnar file and having provision for arresting the motion of said boxes at a point within said frame structure, an elevator mechanism mounted on said frame for reciprocation in a vertical direction, said elevator mechanism being disposed over said conveyers and having provision for engaging leading pairs of said boxes thereon and lifting said boxes upwardly, a clamping means secured to said frame above said elevator mechanism for receiving successive pairs of said boxes lifted thereby and supporting said boxes in a pair of vertical columns, and a horizontally traveling ram mounted on said frame, said ram being travelable above said clamping means in a direction parallel to the direction of travel of said conveyers whereby said pallet receives said pairs of vertical columns of boxes.

References Cited in the file of this patent

UNITED STATES PATENTS

| | | |
|---|---|---|
| 1,292,635 | Parker | Jan. 28, 1919 |
| 2,508,698 | Van Beren | May 23, 1950 |
| 2,687,813 | Verrinder et al. | Aug. 31, 1954 |
| 2,800,992 | Kuper | July 30, 1957 |
| 2,885,097 | Lyon | May 5, 1959 |
| 2,947,125 | Wilson et al. | Aug. 2, 1960 |